Dec. 15, 1925.  1,565,275
P. H. HENKEL
COUPLING HOSE
Filed Dec. 13, 1923
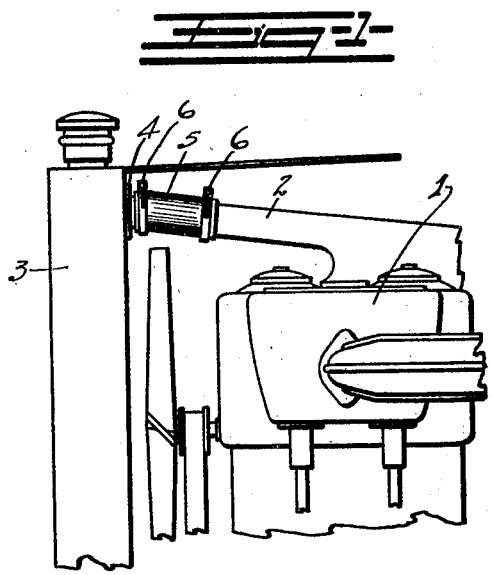
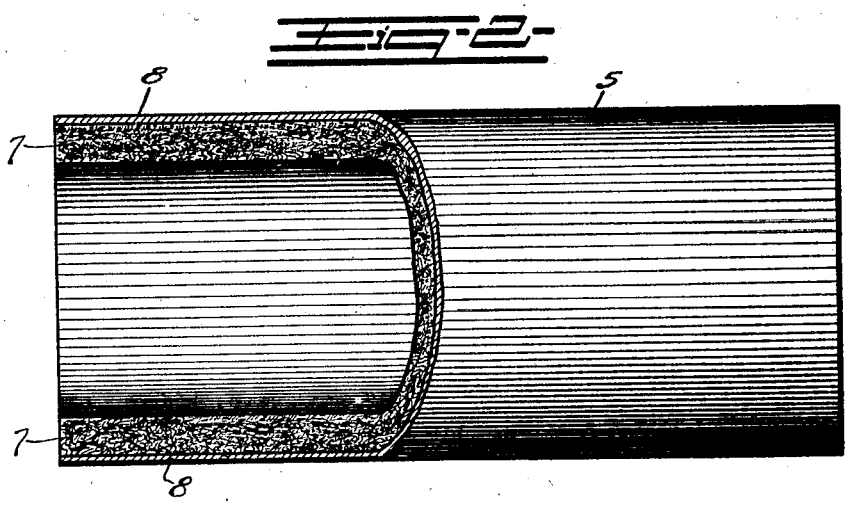
Inventor
Paul H. Henkel
By
Attorney Patented Dec. 15, 1925.

1,565,275

UNITED STATES PATENT OFFICE.

PAUL H. HENKEL, OF ERIE, PENNSYLVANIA, ASSIGNOR TO CONTINENTAL RUBBER WORKS, OF ERIE, PENNSYLVANIA, A CORPORATION OF PENNSYLVANIA.

COUPLING HOSE.

Application filed December 13, 1923. Serial No. 680,330.

*To all whom it may concern:*

Be it known that I, PAUL H. HENKEL, a citizen of the United States, residing at Erie, in the county of Erie and State of Pennsylvania, have invented new and useful Improvements in Coupling Hose, of which the following is a specification.

This invention is designed to improve coupling hose. The conditions under which the radiator coupling hose are used are peculiar. The hose is subjected to very little pressure but to considerable heat and to different solutions in the water so that ordinary pure rubber does not stand up in use. It has, therefore, been customary to form the hose with a woven fabric to re-enforce the hose in the ordinary manner. This fabric, however, is not necessary by reason of pressure but by reason of the action of the liquid on the walls of the tube. It has been attempted to form radiator hose by making the same with a wall of rubber mixed with an unwoven fabric. This construction seems to satisfy the requirements so far as the action of the liquids on the interior of the hose is concerned. It further makes a more convenient hose for attachment to the engine extension and radiator by reason of its greater flexibility but with an unprotected outer surface it is subject to deterioration and presents an uninviting appearance.

I have formed a tube having the advantages of the fibre inner wall and have covered this with a sheath of rubber thus making a protective covering for the fibre stock and thus retaining the advantages of the fibre stock tube and eliminating its disadvantages.

The invention is illustrated in the accompanying drawings as follows:—

Fig. 1 shows a side elevation of a portion of an automobile, having the radiator hose in place.

Fig. 2 a side elevation of the radiator hose partly in section.

1 marks an automobile engine, 2 a hose extension therefrom, 3 a radiator, 4 a hose extension from the radiator, 5 a connecting tube, and 6 the clamps connecting the tube with the extensions.

The tube is made up of an inner wall 7 of unwoven fibre stock and rubber, the fibre knitting the rubber together as it is softened more or less by the hot liquids and solutions sometimes used in the liquids and 8 a protecting sheath of rubber protecting this fibre stock from the air and obviating the unsatisfactory appearance of the fibre surface. The unwoven fibre stock may be made up of rubber and raw fibre or rubber and disintegrated woven fabric. As shown by the drawings the unwoven fibre extends in miscellaneous directions in the wall.

What I claim as new is:—

1. A radiator coupling comprising an inner wall of mixed rubber and unwoven fibre, the elements of the fibre extending in miscellaneous directions in the wall, and an outer wall of rubber united by vulcanization with the inner wall.

2. In combination with an automobile engine, a hose extension, a radiator with its hose extension, and a coupling hose comprising an inner wall of mixed rubber and unwoven fibre, the fibre extending in miscellaneous directions in the wall, and an outer wall of rubber united with the inner wall by vulcanization.

In testimony whereof I have hereunto set my hand.

PAUL H. HENKEL.